US011222055B2

(12) United States Patent
Frison

(10) Patent No.: US 11,222,055 B2
(45) Date of Patent: Jan. 11, 2022

(54) SYSTEM, COMPUTER-IMPLEMENTED METHOD AND COMPUTER PROGRAM PRODUCT FOR INFORMATION RETRIEVAL

(71) Applicant: SAP SE, Walldorf (DE)

(72) Inventor: Giancarlo Frison, Munich (DE)

(73) Assignee: SAP SE, Walldorf (DE)

( * ) Notice: Subject to any disclaimer, the term of this patent is extended or adjusted under 35 U.S.C. 154(b) by 161 days.

(21) Appl. No.: 16/201,737

(22) Filed: Nov. 27, 2018

(65) Prior Publication Data

US 2019/0370273 A1 Dec. 5, 2019

(30) Foreign Application Priority Data

Jun. 5, 2018 (EP) ...................................... 18175933

(51) Int. Cl.
*G06F 16/33* (2019.01)
*G06F 16/338* (2019.01)

(52) U.S. Cl.
CPC ........ *G06F 16/3347* (2019.01); *G06F 16/338* (2019.01); *G06F 16/3334* (2019.01)

(58) Field of Classification Search
CPC ............. G06F 16/3347; G06F 16/3334; G06F 16/338; G06F 16/22; G06F 16/9535
USPC ........................................................ 707/736
See application file for complete search history.

(56) References Cited

U.S. PATENT DOCUMENTS

| | | | |
|---|---|---|---|
| 9,411,906 B2 | 8/2016 | Wu et al. | |
| 2011/0231394 A1* | 9/2011 | Wang ................ | G06F 16/90332 707/723 |
| 2014/0067368 A1 | 3/2014 | Yih et al. | |
| 2014/0280088 A1 | 9/2014 | Speer et al. | |
| 2016/0070748 A1* | 3/2016 | Firat ................... | G06F 16/2425 707/730 |
| 2016/0078860 A1* | 3/2016 | Paulik .................. | G10L 15/197 704/244 |
| 2016/0125028 A1 | 5/2016 | Silvestri et al. | |
| 2017/0139984 A1* | 5/2017 | Bordawekar ......... | G06F 16/243 |
| 2018/0102062 A1* | 4/2018 | Livni ................... | G09B 17/003 |

OTHER PUBLICATIONS

"Communication: Extended European Search Report", dated Sep. 7, 2018 (Sep. 7, 2018), European Patent Office, for European Application No. 18175933.3-1217, 8pgs.

* cited by examiner

*Primary Examiner* — Syed H Hasan
*Assistant Examiner* — Nicholas E Allen
(74) *Attorney, Agent, or Firm* — Buckley, Maschoff & Talwalkar LLC

(57) ABSTRACT

A system is provided, which may comprise: a word vector database configured to store word vectors, each of the word vectors representing a word or a phrase; a text database configured to store text data; and a processor configured to: receive a user input including a first term; obtain, for each word vector that is stored in the word vector database and that represents a word or a phrase other than the first term, a similarity between that word vector and a word vector representing the first term; select at least one second term based on the obtained similarity; perform a search in the text database using the at least one second term as a query for the search; and provide results of the search.

17 Claims, 9 Drawing Sheets

SYSTEM, COMPUTER-IMPLEMENTED METHOD AND COMPUTER PROGRAM PRODUCT FOR INFORMATION RETRIEVAL

CROSS-REFERENCE TO RELATED APPLICATIONS

The present application claims priority under 35 U.S.C. § 119(a) to EP Patent Application No. 18175933.3, filed Jun. 5, 2018, the contents of which are incorporated herein by reference for all purposes.

BACKGROUND

The application relates to a system, a computer-implemented method and a computer program product for information retrieval. More specifically, the application relates to retrieving information from a collection of text data.

Search engines may help finding relevant matches against a query according to various information retrieval algorithms. Those systems (based generally on e.g. vector space and boolean models) can find occurrences of a term and classify documents into topics. Those activities (e.g. indexing), regardless of their effectiveness, are often unequivocally related to the provided documents and their vocabulary. Thus, it may not be possible to retrieve documents by searching terms that are not present in the collection of documents comprised in the search space (e.g. a document database).

BRIEF DESCRIPTION

According to an aspect, the problem relates to facilitating efficient retrieval of information. The problem is solved by the features disclosed by the independent claims. Further exemplary embodiments are defined by the dependent claims.

According to an aspect, a system is provided. The system may comprise:
  a word vector database configured to store word vectors, each of the word vectors representing a word or a phrase;
  a text database configured to store text data; and
  a processor configured to:
    receive a user input including a first term;
    obtain, for each word vector that is stored in the word vector database and that represents a word or a phrase other than the first term, a similarity between that word vector and a word vector representing the first term;
    select at least one second term based on the obtained similarity;
    perform a search in the text database using the at least one second term as a query for the search; and
    provide results of the search.

In various embodiments and examples described herein, the term "word vector" may be understood as a numeric vector (e.g., a list of real numbers) representing a word or a phrase.

In various embodiments and examples described herein, the term "similarity" between word vectors may be understood as a value determined by calculating a similarity measure or a distance metric between the word vectors. In some examples, a larger value of the similarity may indicate that the word vectors are closer to each other as compared to word vectors with a smaller value of the similarity. In other examples, a smaller value of the similarity may indicate that the word vectors are closer to each other as compared to word vectors with a larger value of the similarity.

In the system of the above-stated aspect, in order to select the at least one second term based on the obtained similarity, the processor may be configured to:
  identify, according to the obtained similarity, a specified number of word vectors being closest to the word vector representing the first term; and
  select, as the at least one second term, the specified number of words represented by the specified number of word vectors.

In the system of the above-stated aspect, the processor may further be configured to:
  when a plurality of the second terms are selected, determine a relatedness score for each one of the plurality of the second terms based on the similarity between the word vector representing said one of the plurality of the second terms and the word vector representing the first term;
  obtain a ranking score for each one of the results of the search;
  determine, for each one of the results of the search, a sorting score based on the ranking score obtained for said one of the results of the search and the relatedness score for one of the plurality of the second terms which has been used for obtaining said one of the results of the search; and
  sort the results of the search according to the sorting scores.

In various embodiments and examples described herein, the ranking score for each of the results of the search may be obtained from a known search software that is used for performing the search in the text database. The search software may determine and provide a ranking score for each search result (e.g., each text data item identified as a search result), indicating a level of relevance of that search result.

In the system of the above-stated aspect, the obtained similarity may be a cosine similarity between the word vector representing the word or the phrase other than the first term and the word vector representing the first term. Further, the relatedness score for each one of the plurality of the second terms may include a value of the cosine similarity between the word vector representing the first term and the word vector representing said one of the plurality of the second terms.

In various embodiments and examples described herein, the text data stored in the text database may be directed to a specific topic and the word vectors stored in the word vector database may be obtained by processing, according to a word embedding algorithm, a corpus including texts directed to the specific topic.

Further, the system according to the above-stated aspect may further comprise a word embedding system configured to obtain the word vectors by processing, according to the word embedding algorithm, the corpus including texts directed to the specific topic.

In various embodiments and examples described herein, the term "word embedding algorithm" may be understood as an algorithm for mapping words (and optionally also phrases) to vectors of real numbers.

In various embodiments and examples described herein, the word embedding algorithm may use character n-grams of words in the corpus for obtaining the word vectors.

According to another aspect, a computer-implemented method is provided. The method may comprise:

receiving a user input including a first term;

obtain, for each word vector that is stored in a word vector database and that represents a word or a phrase other than the first term, a similarity between that word vector and a word vector representing the first term;

selecting at least one second term based on the obtained similarity;

performing a search in a text database configured to store text data using the at least one second term as a query for the search; and providing results of the search.

In the method according to the above-stated aspect, said selecting the at least one second term based on the obtained similarity may further comprise:

identifying, according to the obtained similarity, a specified number of word vectors being closest to the word vector representing the first term; and selecting, as the at least one second term, the specified number of words represented by the specified number of word vectors.

The method according to the above-stated aspect may further comprise:

when a plurality of the second terms are selected, determining a relatedness score for each one of the plurality of the second terms based on the similarity between the word vector representing said one of the plurality of the second terms and the word vector representing the first term;

obtaining a ranking score for each one of the results of the search;

determining, for each one of the results of the search, a sorting score based on the ranking score obtained for said one of the results of the search and the relatedness score for one of the plurality of the second terms which has been used for obtaining said one of the results of the search; and sorting the results of the search according to the sorting scores.

In the method according to the above-stated aspect, the obtained similarity may be a cosine similarity between the word vector representing the word or the phrase other than the first term and the word vector representing the first term. Further, the relatedness score for each one of the plurality of the second terms includes a value of the cosine similarity between the word vector representing the first term and the word vector representing said one of the plurality of the second terms.

In the method according to the above-stated aspect, the text data stored in the text database may be directed to a specific topic and the word vectors stored in the word vector database may be obtained by processing, according to a word embedding algorithm, a corpus including texts directed to the specific topic.

The method according to the above-stated aspect may further comprise: obtaining the word vectors by processing, according to the word embedding algorithm, the corpus including texts directed to the specific topic.

The word embedding algorithm may use character n-grams of words in the corpus for obtaining the word vectors.

According to yet another aspect, a computer program product is provided. The computer program product may comprise computer-readable instructions that, when loaded and run on a computer, cause the computer to perform the method according to any one of the aspect and examples stated above.

According to the various aspects and examples as stated above, information concerning one or more terms that are not included in the user input but are related to the term included in the user input can be retrieved from the text database.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION

In the following text, a detailed description of examples will be given with reference to the drawings. It should be understood that various modifications to the examples may be made. In particular, one or more elements of one example may be combined and used in other examples to form new examples.

System Configuration

Figure 1:
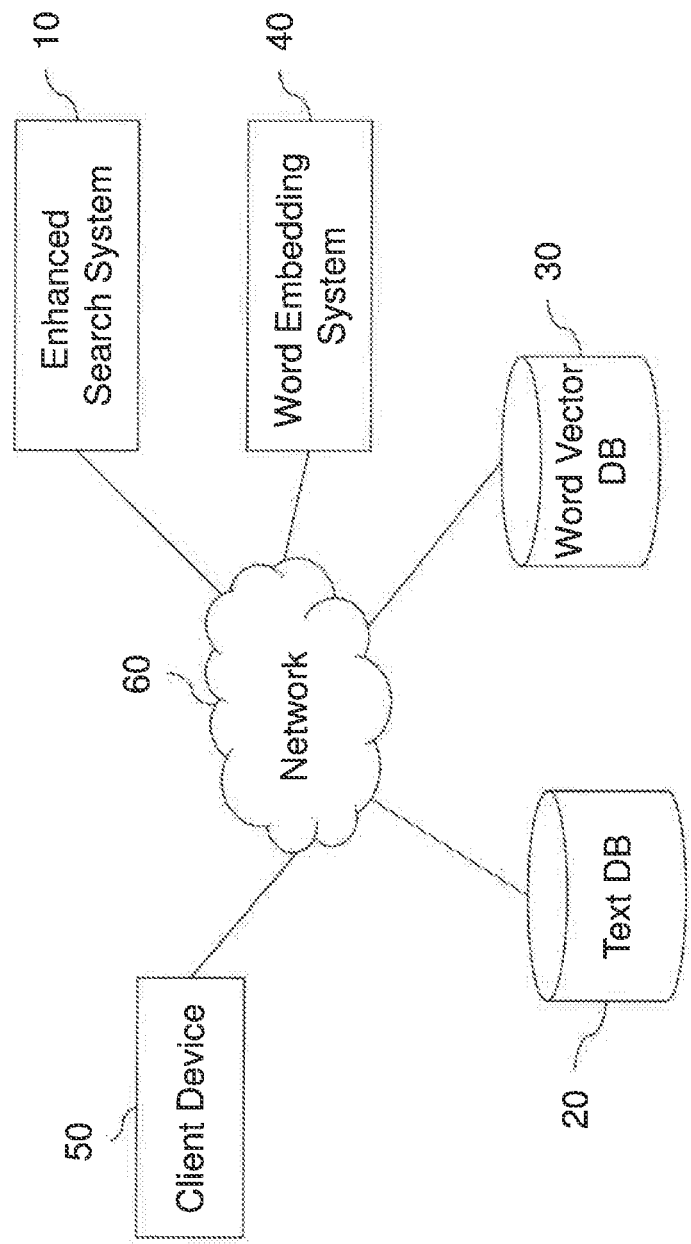
FIG. 1 shows an example of a system including the system according to the present disclosure.

FIG. 1 shows an example of a system including the system according to the present disclosure.

The exemplary system shown in FIG. 1 comprises an enhanced search system 10, a text database (DB) 20, a word vector DB 30, a word embedding system 40 and a client device 50, which are connected via a network 60. The network 60 may include the Internet and/or one or more intranets. Further, at least part of the network 60 may be implemented by a wireless network (e.g. wireless local area network (WLAN), cellular network, etc.).

The enhanced search system 10 may be configured to search information in the text DB 20. The text DB 20 may be a database configured to store text data. The text data stored in the text DB 20 may include a plurality of items, for example, a plurality of document files, each of which containing some text. The text data stored in the text DB 20 may relate to any kind of texts. In some examples, however, the text data stored in the text DB 20 may be directed to a specific topic. For instance, in case the text DB 20 stores text data including catalogue information of an e-commerce application, the text data may be directed to a specific kind of products or services (e.g., food, cars, hotels, travelling, etc.).

The enhanced search system 10 may, for example, be configured to receive from the client device 50 a user input such as a query including a term, search the text DB 20 using the query and provide search results to the client device 50. Further, the enhanced search system 10 may be configured to perform not only a search for a term (e.g. first term) included in the query but also a search for one or more other terms (e.g. second term(s)) that are not included in the query but are related to the (first) term in the query. The enhanced search system 10 may be configured to select the (second) term(s) related to the (first) term in the query with reference to the word vector DB 30.

The word vector DB 30 may be a database storing vector representations of words and (optionally) phrases that may appear in the user input. The words represented by vectors in the word vector DB 30 may be referred to as "vocabulary" of the word vector DB 30. For example, for each of the words (and optionally also phrases) in the vocabulary, the word vector DB 30 may store a numeric vector (e.g., a list of real numbers) representing that word (or phrase) in relation to the other words in the vocabulary. In the present disclosure, the numeric vector representing a word or a phrase is referred to also as a "word vector". Techniques of mapping words or phrases to vectors of real numbers may be referred to as "word embedding".

The details of how the enhanced search system 10 may select the related (second) term(s) with reference to the word vector DB 30 will be described later in more detail.

The word embedding system 40 may be configured to obtain word vectors to be stored in the word vector DB 30. For example, the word embedding system 40 may be configured to obtain word vectors by processing a corpus including a large and structured set of texts, according to a word embedding algorithm for mapping words or phrases to vectors of real numbers. With a word embedding algorithm, similar word vectors can be obtained for words that are somehow related. The similarity between two word vectors may be determined quantitatively by calculating a similarity measure or a distance metric between the two word vectors. In some examples, a cosine similarity may be used for determining the similarity between the two word vectors. Examples of a word embedding algorithm may include, but are not limited to, word2vec, fastText and GloVe. In the examples where the text data stored in the text DB 20 is directed to a specific topic, the corpus used for obtaining the word vectors may also be directed to that specific topic. The details of the word embedding system 40 will be described later.

The client device 50 may be implemented by a computer such as a personal computer. In some examples, the client device 50 may be a mobile device such as mobile phone (e.g. smartphone), a tablet computer, a laptop computer, a personal digital assistant (PDA), etc. The client device 50 may, upon request by a user, access the enhanced search system 10 via the network 60 and provide the enhanced search system with a user input including a term (e.g. first term). The client device 50 may further receive search results from the enhanced search system 10. It should be noted that, although FIG. 1 shows only one client device 50, more than one client device 50 may be connected to the network 60.

Figure 2:
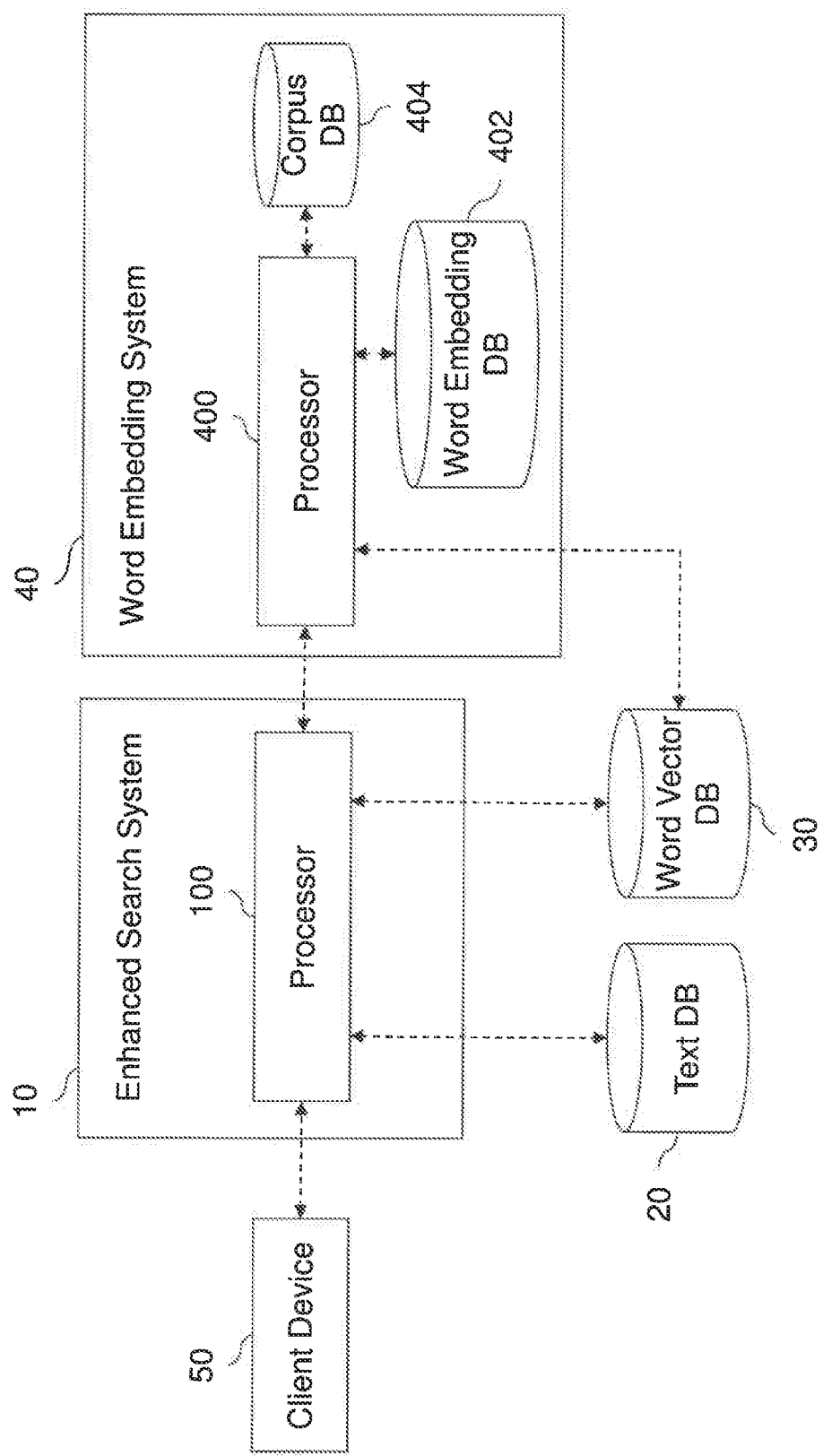
FIG. 2 shows an exemplary functional block diagram of the exemplary system shown in FIG. 1.

FIG. 2 shows an exemplary functional block diagram of the exemplary system shown in FIG. 1. As can be seen from FIG. 2, the enhanced search system 10 may include a processor 100.

The processor 100 of the enhanced search system 10 may be in communication with the word embedding system 40 and the client device 50. Further, the processor 100 of the enhanced search system 10 may have access to the text DB 20 and the word vector DB 30.

The processor 100 of the enhanced search system 10 may be configured to perform a process necessary for searching information in the text DB 20 according to various embodiments and examples of the present disclosure as described herein.

For example, the processor 100 of the enhanced search system 10 may be configured to receive a user input including a first term. The user input may be received from the client device 50. The user input may be considered as a query including the first term. The processor 100 may further be configured to obtain, for each word vector that is stored in the word vector DB 30 and that represents a word or a phrase other than the first term, a similarity between that word vector and a word vector representing the first term. In some examples, the similarity may be a cosine similarity. In order to obtain the similarity, the processor 100 may employ software such as dl4j, nlpk, gensim or spacy, etc. Further, the processor 100 may be configured to select at least one second term based on the obtained similarity. The processor 100 may further be configured to perform a search on the text DB 20 using the at least one second term as a query for the search and provide results of the search. The details of the exemplary process performed by the processor 100 of the enhanced search system 10 will be described later.

Further, as can be seen from FIG. 2, the word embedding system 40 may include a processor 400, a word embedding DB 402 and a corpus DB 404.

The processor 400 of the word embedding system 40 may be configured to perform process necessary for obtaining word vectors to be stored in the word vector DB 30. The processor 400 may have access to a word embedding DB 402, a corpus DB 404 and the word vector DB 30.

The word embedding DB 402 may be a database configured to store information necessary for the processor 400 to perform a process according to a word embedding algorithm. For example, the word embedding DB 402 may store information representing a word embedding model used in the word embedding algorithm. Examples of word embedding models used in different word embedding algorithms will be described later below.

The corpus DB 404 may be a database configured to store a corpus including a large and structured set of texts. In the examples where the text data stored in the text DB 20 is directed to a specific topic, the corpus DB 404 may store a corpus directed to that specific topic. The texts included in the corpus stored in the corpus DB 404 may be collected, for example, from websites on the Internet. For instance, in case of constructing a corpus directed to the specific topic, blog posts about the specific topic may be collected. The collected text may be processed, for example, to have a format suitable for use in the word embedding algorithm and then included in the corpus. For example, non-alphanumeric characters may be removed from the collected text. Additionally or alternatively, the collected text may be normalized to include one sentence in one row and/or to include normalized spaces. Further, for example, the collected text may be processed so that the whole text corpus will be in accordance with a particular encoding scheme (e.g. UTF-8).

The processor 400 of the word embedding system 40 may be configured to process, according to a word embedding algorithm, the corpus stored in the corpus DB 404. For example, the processor 400 may be configured to train a word embedding model of the word embedding algorithm, stored in the word embedding DB 402, using the corpus stored in the corpus DB 404. Further, the processor 400 may be configured to store the word vectors obtained by processing the corpus in the word vector DB 30. The details of the exemplary process performed by the processor 400 of the word embedding system 40 will be described later below.

It should be noted that, although FIG. 2 shows a single processor 100 or 400 for each of the enhanced search system 10 and the word embedding system 40, each of the enhanced search system 10 and the word embedding system 40 may comprise more than one processors 100 or 400 for performing the processes as described herein.

Further, although the enhanced search system 10 and the word embedding system 40 are explained with reference to FIGS. 1 and 2 as two separate systems, in some examples, the enhanced search system 10 and the word embedding system 40 may be implemented as a single system with one or more processors.

Examples of Word Embedding Models

In a word embedding algorithm, a word embedding model is trained for mapping words or phrases to word vectors of real numbers. The following provides examples of word embedding models used in different word embedding algorithms.

(i) Continuous Bag-of-Words (CBOW) Model (word2vec)

A continuous bag-of-words (CBOW) model may be used in a word embedding algorithm called word2vec developed by a team at Google led by Tomas Mikolov (see e.g., https://code.google.com/archive/p/word2vec/).

Figure 3:
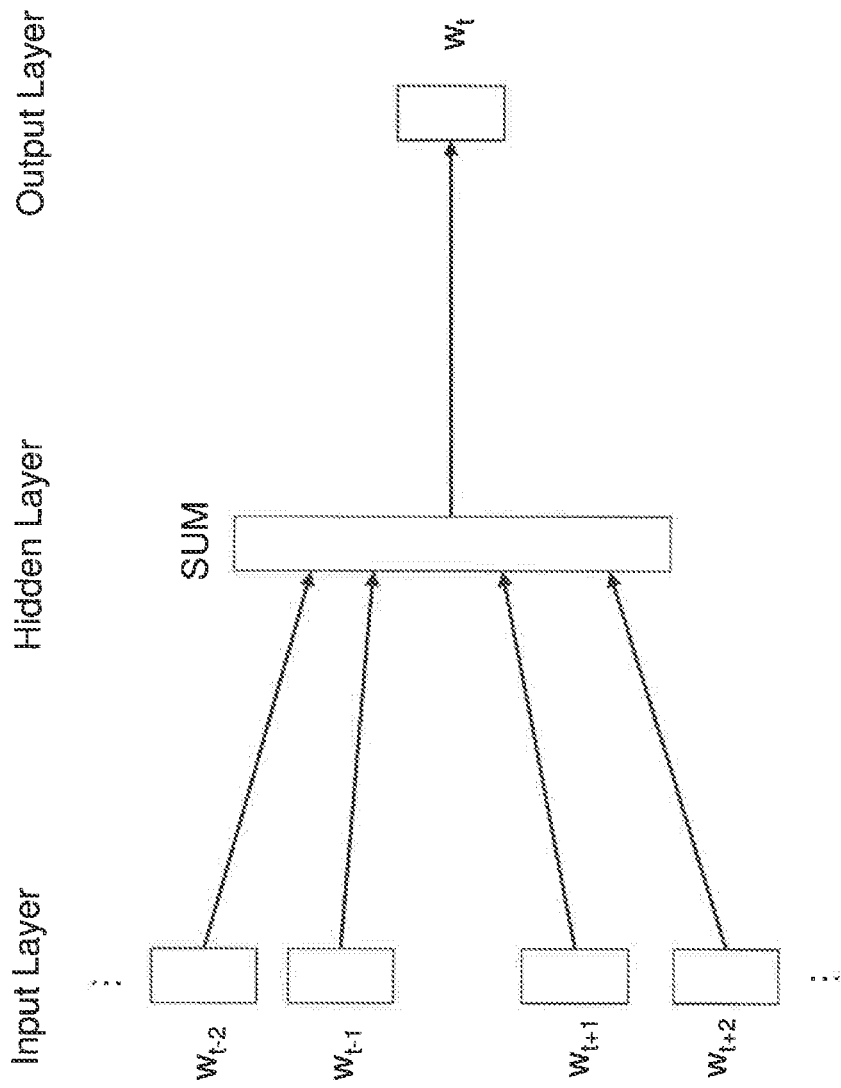
FIG. 3 shows a schematic diagram representing an exemplary architecture of a word embedding model called continuous bag-of-words (CBOW) model.

The CBOW model may be understood as a neural network for predicting the current word from a window of surrounding context words. FIG. 3 shows a schematic diagram representing an exemplary architecture of the CBOW model. As shown in FIG. 3, the CBOW model may include an input layer taking the surrounding context words $w_{t-2}$, $w_{t-1}$, $w_{t+1}$, $w_{t+2}$, as inputs, a hidden layer and an output layer which outputs the current word $w_t$. Each of the context words $w_{t-2}$, $w_{t-1}$, $w_{t+1}$, $w_{t+2}$ and the current word $w_t$ may be a one-hot encoded representation of the word, e.g., a vector having a dimension of a vocabulary size, where only one element corresponding to a particular word has a value "1" and all other elements have a value "0". The CBOW model may be trained using the corpus as training data to predict the current word $w_t$ from the context words $w_{t-2}$, $w_{t+1}$, $w_{t+1}$, $w_{t+2}$. Word vectors representing words in the corpus may be obtained from the weights of the trained CBOW model.

Detailed explanations on the CBOW model in the word2vec algorithm and its training methods are provided in Tomas Mikolov, et al., "Efficient Estimation of Word Representations in Vector Space" in Proceedings of Workshop at ICLR, 2013; and Xin Rong, "word2vec Parameter Learning Explained", November 2014 (available online at: https://arxiv.org/abs/1411.2738v4).

It should be noted that, although FIG. 3 shows four context words to be input to the input layer (e.g. window size of five words), the number of context words input to the input layer may be more than or less than four. In other words, the window size for the context words may be more than or less than five.

(ii) Skip-Gram Model (word2vec)

Figure 4:
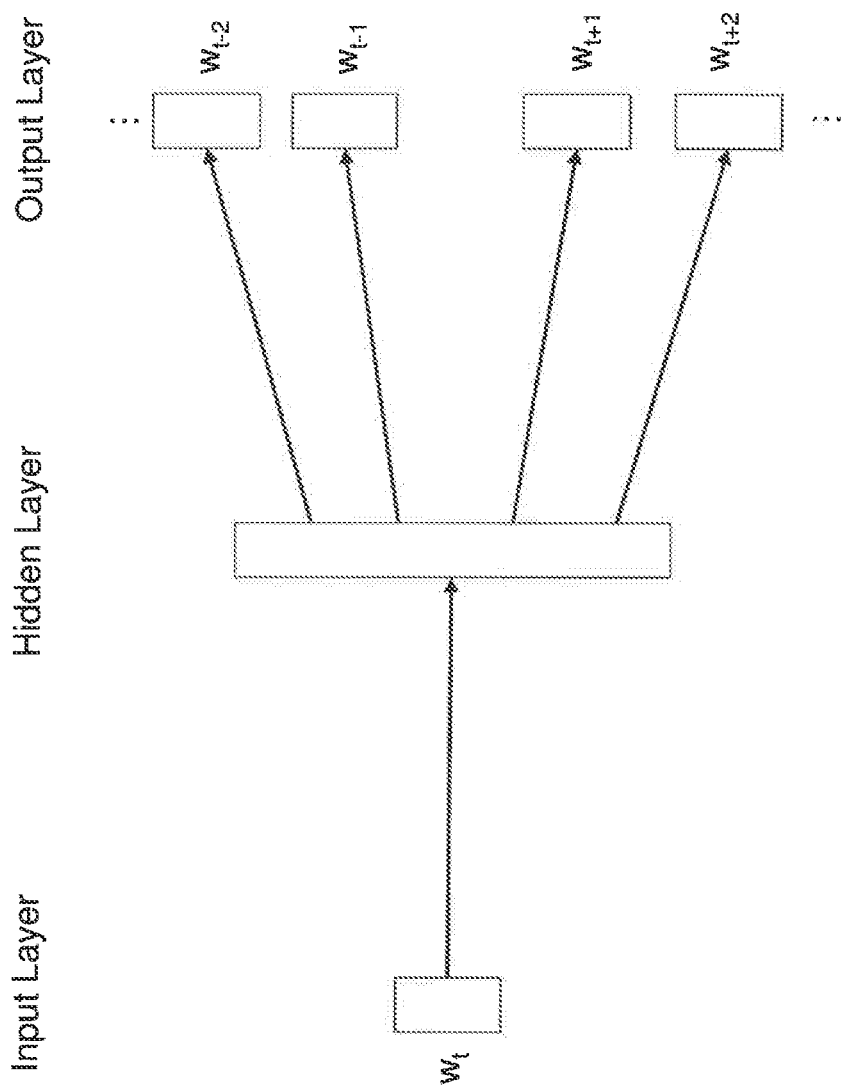
FIG. 4 shows a schematic diagram representing an exemplary architecture of a word embedding model called skip-gram model.

Another example of a model that may be used in the word2vec algorithm is called skip-gram model. In contrast to the CBOW model, the skip-gram model may be considered as a neural network for predicting the surrounding window of context words from the current word. FIG. 4 shows a schematic diagram representing an exemplary architecture of the skip-gram model. As shown in FIG. 4, the skip-gram model may include an input layer taking the current word $w_t$ as an input, a hidden layer and an output layer which outputs the surrounding context words $w_{t-2}$, $w_{t-1}$, $w_{t+1}$, $w_{t+2}$. As in the case of the CBOW model, each of the context words $w_{t-2}$, $w_{t-1}$, $w_{t+1}$, $w_{t+2}$ and the current word $w_t$ may be a one-hot encoded representation of the word. The skip-gram model may be trained using the corpus as training data to predict the surrounding context words $w_{t-2}$, $w_{t-1}$, $w_{t+1}$, $w_{t+2}$ from the current word $w_t$. Word vectors representing words in the corpus may be obtained from the weights of the trained skip-gram model.

Detailed explanations on the skip-gram model in the word2vec algorithm and its training methods are provided in, for example, Tomas Mikolov, et al., "Distributed Representations of Words and Phrases and their Compositionality", In Proceedings of NIPS, 2013; and Xin Rong, "word2vec Parameter Learning Explained", November 2014 (available online at: https://arxiv.org/abs/1411.2738v4).

It should be noted that, although FIG. 4 shows four context words to be output from the output layer (e.g. window size of five words), the number of context words output from the output layer may be more than or less than four. In other words, the window size for the context words may be more than or less than five.

(iii) Subword Model with Character N-Grams (fastText)

Another exemplary word embedding model is a subword model used in fastText developed by Facebook AI Research, described in Bojanowski et al., "Enriching Word Vectors with Subword Information", June 2017 (available online at: https://arxiv.org/abs/1607.04606). FastText may provide an extension of the above-stated skip-gram model, which takes into account subword information. In fastText, a vector representing a word may be obtained by learning vectors for character n-grams within the word and summing those vectors to produce the vector representing the word.

In the subword model, each word w may be represented as a bag of character n-grams. For example, a word "where" in case of n=3 may be represented by the following character n-grams: <wh, whe, her, ere, re>; and a special sequence representing the word itself: <where>. In the subword model explained in Bojanowski et al. mentioned above, all the n-grams for n greater or equal to 3 and smaller or equal to 6 are extracted.

Since fastText using the subword model may consider words as a sum of character n-grams, fastText can predict a representation for a new word which is not in the vocabulary of the corpus (in other words, an out-of-vocabulary word) by summing the vectors for the character n-grams in the new word.

In case the word embedding system 40 uses fastText for obtaining the word vectors, the word embedding system 40 may store also the vectors representing the character n-grams in the word vector DB 30, in addition to the obtained word vectors.

(iv) GloVe Model

Yet another example of a word embedding algorithm is called GloVe, developed at Stanford University and described in Pennington et al., "GloVe: Global Vectors for Word Representation", Proceedings of the 2014 Conference on Empirical Methods in Natural Language Processing (EMNLP), p. 1532-1543, Oct. 25-29, 2014, Doha, Qatar (available online at: https://aclweb.org/anthology/D14-1162). The GloVe model may be a log-bilinear model with a weighted least-squares objective. The training objective of GloVe may be to learn word vectors such that their dot product equals the logarithm of the words' probability of co-occurrence. In the GloVe algorithm, the GloVe model may be trained on the non-zero entries of a global word-word co-occurrence matrix, which tabulates how frequently words co-occur with one another in a given corpus. The source code for the GloVe model as well as trained word vectors are available online at: http: https://nlp.standord.edu/projects/glove/).

Any of the exemplary word embedding algorithms/models may be employed by the word embedding system 40 shown in FIGS. 1 and 2. Further, in some examples, a word embedding algorithm/model other than the examples as stated above may also be employed by the word embedding system 40, as long as the algorithm/model provides similar word vectors for words that are somehow related.

Process for Training a Word Embedding Model

Figure 5:
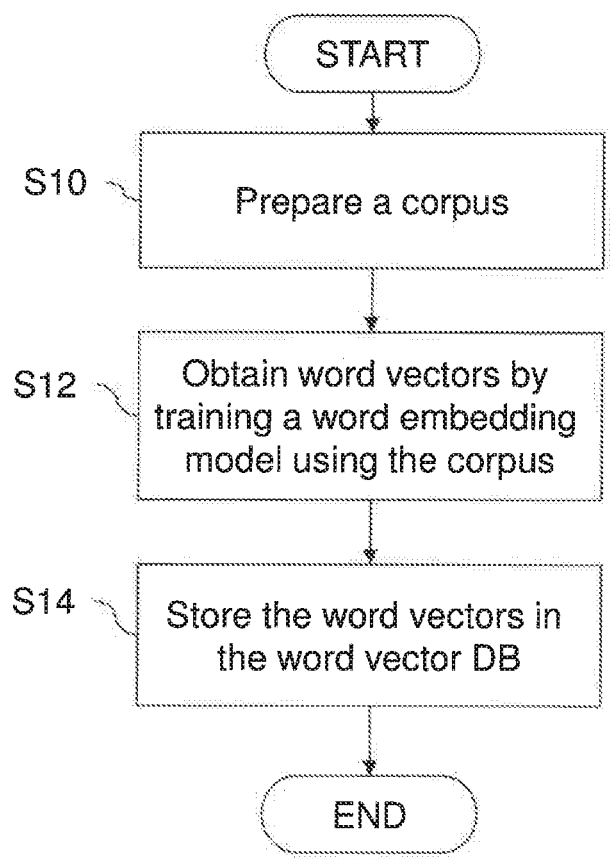
FIG. 5 shows a flowchart of an exemplary process for training a word embedding model.

FIG. 5 shows a flowchart of an exemplary process performed by the processor 400 of the word embedding system 40 for training a word embedding model.

The exemplary process shown in FIG. 5 may start, for example, when an operator or developer of the enhanced search system 10 instructs the word embedding system 40 to obtain word vectors. Instructions from the operator or developer may be received via an input device (not shown) or a client device (not shown) connected to the enhanced search system 10 and/or the word embedding system 40. In case the input device or the client device is connected only to the enhanced search system 10, the word embedding system 40 may receive the instructions via the enhanced search system 10.

First, at step S10, the processor 400 of the word embedding system 40 may prepare a corpus. For example, in case a corpus directed to a specific topic (e.g., the same topic as the text data stored in the text DB 20) is required, the processor 400 may search and collect texts of that topic on the Internet using an Internet search engine such as Google, Bing, Yahoo!, etc. Keywords for searching texts of the specific topic may be provided by the operator or developer of the enhanced search system 10. In some examples, blog posts and/or other articles on the Internet directed to the specific topic may be collected. The processor 400 may process the collected text to be suitable for use in the word embedding algorithm. For example, non-alphanumeric characters may be removed from the collected text. Additionally or alternatively, the collected text may be normalized to include one sentence in one row and/or to include normalized spaces. Further, for example, the collected text may be processed so that the whole text corpus will be in accordance with a particular encoding scheme (e.g. UTF-8). The corpus prepared at step S10 may be stored in the corpus DB 404. The process may proceed to step S12 after step S10.

At step S12, the processor 400 of the word embedding system 400 may obtain word vectors by training a word embedding model using the corpus stored in the corpus DB 404. For example, one of the CBOW model, the skip-gram model, the subword model, and the GloVe model as stated above may be trained according to the corresponding word embedding algorithm. The information necessary for the training, e.g. model architecture and parameters for training, may be stored in the word embedding DB 402 which can be accessed by the processor 400. The process may proceed to step S14 after step S12.

At step S14, the processor 400 of the word embedding system 400 may store the obtained word vectors in the word vector DB 30. The exemplary process of FIG. 3 may end after step S14.

As stated above, a corpus directed to a specific topic may be prepared at step S10. Thus, the word vectors obtained by training the word embedding model using the corpus directed to the specific topic may contain more information regarding similarities (e.g. relatedness) between words used within the context of the specific topic as compared to a generic corpus (e.g. a publicly available corpus such as Google News corpus, Wikipedia corpus, etc.).

Process for Information Retrieval Using Word Vectors

After word vectors are stored in the word vector DB 30 with the exemplary process shown in FIG. 5 performed by the word embedding system 40, the enhanced search system 10 may retrieve information from the text DB 20 with reference to the word vector DB 30.

Figure 6:
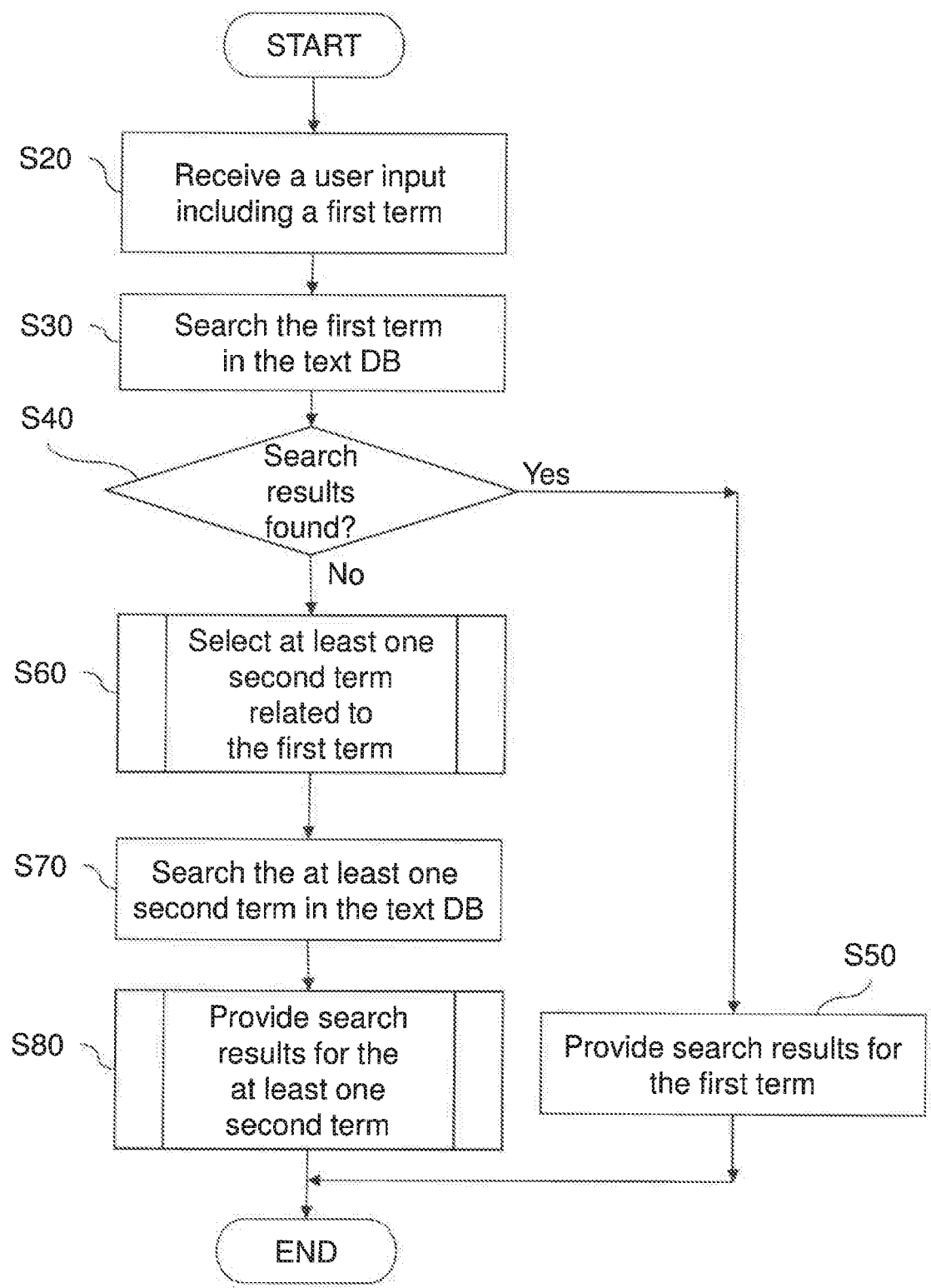
FIG. 6 shows a flowchart of an exemplary process for retrieving information from a text database (DB).

FIG. 6 shows a flowchart of an exemplary process for retrieving information from the text DB 20. The processor 100 of the enhanced search system 10 may perform the exemplary process shown in FIG. 6. The exemplary process shown in FIG. 6 may start when a user requests, using the client device 50, a search for information in the text DB 20.

At step S20, the processor 100 of the enhanced search system 10 may receive a user input including a first term. The processor 100 may receive the user input from the client device 50. In some examples, in case the text data stored in the text DB 20 includes catalogue information of an e-commerce application, the first term may relate to a product or service the user is interested in. The process may proceed to step S30 after step S20.

At step S30, the processor 100 of the enhanced search system 10 may search the first term in the text DB 20. For example, the processor 100 may perform the search in the text DB 20 using a known search software such as Apache Lucene. The search software may identify, as search results, text data items (e.g., document files) that include the first term. Further, the search software may determine a ranking score for each of the identified text data items, indicating a level of relevance of that text data item. For example, the ranking score may have a value between 0 and 1, indicating that the search result is more relevant as the value is closer to 1. The process may proceed to step S40 after step S30.

At step S40, the processor 100 of the enhanced search system 10 may determine whether search results for the first term have been found by the search at step S30.

If search results of the first term have been found (Yes at step S40), the process may proceed to step S50 where the processor 100 provides the search results for the first term. The search results may be sorted according to the ranking scores. At step S50, for example, the processor 100 may send the search results to the client device 50 and the client device 50 may display the search results on a display device (not shown) of the client device 50. The exemplary process of FIG. 6 may end after step S50.

If no search result has been found for the first term (No at step S40), the process may proceed to step S60.

At step S60, the processor 100 of the enhanced search system 10 may select at least one second term related to the first term.

Figure 7:
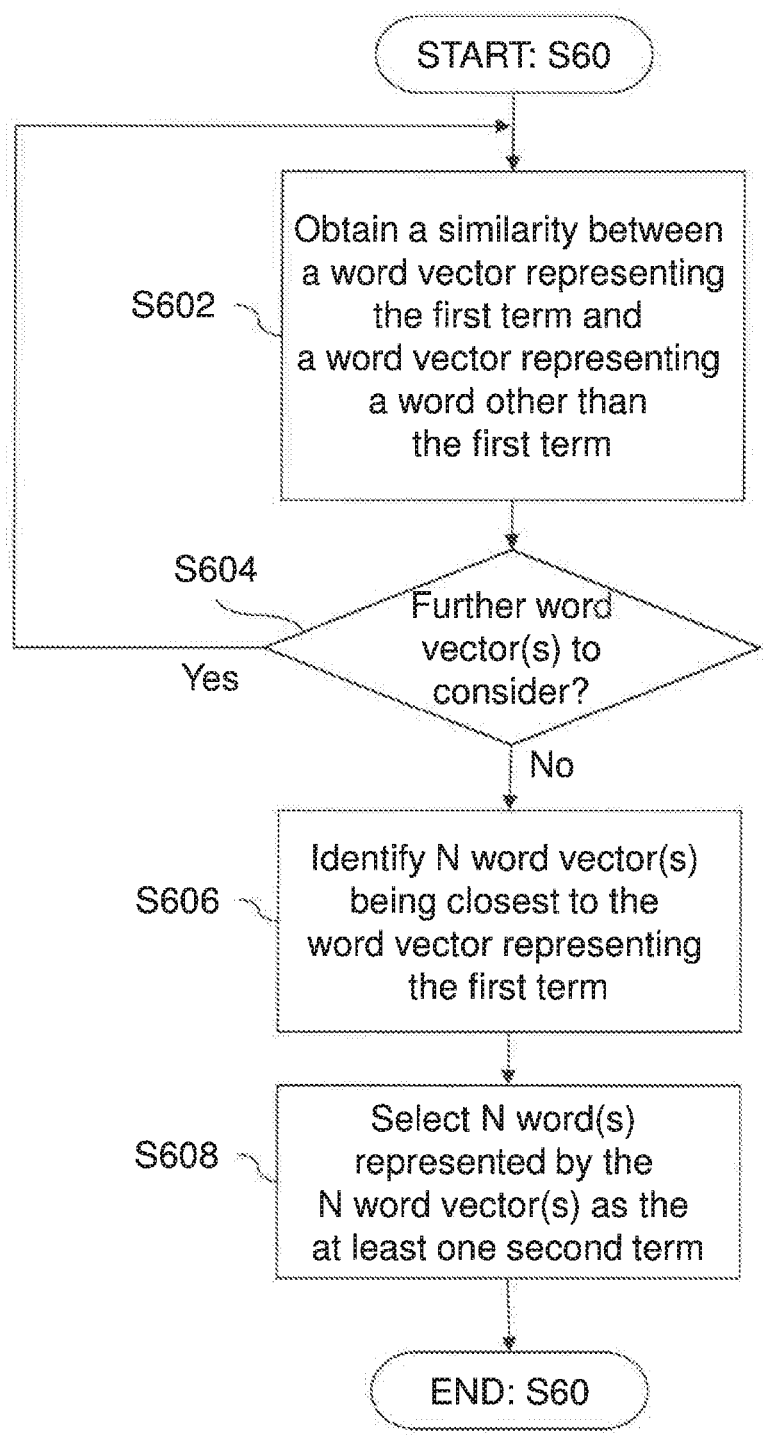
FIG. 7 shows a flowchart of an exemplary process performed in step S60 of FIG. 6.

FIG. 7 shows a flowchart of an exemplary process performed in step S60 of FIG. 6.

At step S602 of FIG. 7, the processor 100 of the enhanced search system 10 may obtain a similarity between a word vector representing the first term and a word vector representing a word (or a phrase) other than the first term. For example, the processor 100 may access the word vector DB 30 and retrieve the word vector representing the first term and one of the word vectors stored in the word vector DB 30, representing a word (or a phrase) other than the first term. Further, the processor 100 may calculate a similarity measure or a distance metric between the two word vectors retrieved from the word vector DB 30 and the calculated value may be considered as the similarity between the two vectors. In some examples, a cosine similarity between the two word vectors may be calculated. For instance, when the two word vectors are denoted by v and w, the cosine similarity may be calculated according to the following formula:

$$\cos\theta = \frac{v \cdot w}{\|v\| \, \|w\|} = \frac{v \cdot w}{\sqrt{v \cdot v} \, \sqrt{w \cdot w}}$$

The cosine similarity calculated according to the formula above may take a value between −1 and 1 and the two word vectors may be considered more similar as the value of the cosine similarity is closer to 1. For example, the two word vectors may be considered as being:

totally opposed to each other when the value of the cosine similarity is −1;
orthogonal to each other when the value of the cosine similarity is 0; and
in the same angle when the value of the cosine similarity is 1.

In case no word vector stored in the word vector DB 30 corresponds to the first term, the processor 100 of the enhanced search system 10 may determine a word vector representing the first term according to a predetermined method or algorithm. For example, in case fastText is used for obtaining the word vectors stored in the word vector DB 30, the processor 100 of the enhanced search system 10 may predict a word vector representing the first term by summing the vectors for the character n-grams in the out-of-vocabulary word. The vectors for the character n-grams can be obtained from the word vector DB 30.

It is noted that, however, in case the text data stored in the text DB 20 is directed to a specific topic, it may be likely that the first term in the user input is also related to the specific topic. In such a case, if the corpus stored in the corpus DB 404, which is used for obtaining the word vectors, is also directed to the specific topic, the likelihood of the first term being an out-of-vocabulary word can be decreased as compared to the case of using, for obtaining the word vectors, a generic corpus (e.g. Google News corpus, Wikipedia corpus, etc.) that is not specific for a particular topic.

In order to obtain the similarity at step S602 as stated above, the processor 100 may employ software such as dl4j, nlpk, gensim or spacy, etc.

The process may proceed to step S604 after step S602.

At step S604, the processor 100 of the enhanced search system 10 may determine whether or not the similarities have been obtained for all the word vectors in the word vector DB 30, representing words (and/or phrases) other than the first term. In other words, the processor 100 may determine whether or not the word vector DB 30 stores further word vector(s) for which the similarity with the word vector representing the first term is(are) to be calculated.

If the processor 100 determines that the similarity should be determined for further word vector(s) in the word vector DB 30 (Yes at step S604), the process may return to step S602 and the similarity may be calculated between the word vector representing the first term and a word vector for which the similarity has not yet been calculated and which represents a word (or a phrase) other than the first term.

If the processor 100 determines that no further word vector needs to be considered (No at step S604), in other words, if the processor 100 determines that the similarities for all the word vectors in the word vector DB 30, which represent words (and/or phrases) other than the first term, have been obtained, the process may proceed to step S606.

At step S606, the processor 100 may identify a specified number N (N=1, 2, 3, . . . ) of word vectors being closest to the word vector representing the first term, according to the similarities obtained by the process loop including steps S602 and S604. For example, in case a larger similarity value indicates closeness between two word vectors, the processor 100 may identify N word vectors having the largest similarity values among the word vectors for which the similarities have been obtained. Alternatively, in case a smaller similarity value indicates closeness between two word vectors, the processor 100 may identify N word vectors having the smallest similarity values among the word vectors for which the similarities have been obtained. The value of N may be specified by a developer of the enhanced search system 10, for example. The process may proceed to step S608 after step S606.

At step S608, the processor 100 may select N words represented by the N word vectors identified at step S606 as the at least one second term. After step S608, step S60 shown in FIG. 6 may end and the process may proceed to step S70 of FIG. 6.

Referring again to FIG. 6, at step S70, the processor 100 may search, in the text DB 20, the at least one second term selected at step S60. In other words, the processor 100 may perform a search in the text DB 20 using the at least one second term as a query for the search. The search may be performed using the same search software as the one used in step S30. As in step S30, the search software may identify text data items including the at least one second term as search results and determine a ranking score for each search result (e.g., each of the identified text data items). Further, as in step S30, in some examples, the ranking score may have a value between 0 and 1, indicating that the search result is more relevant as the value is closer to 1. The process may proceed to step S80 after step S70.

At step S80, the processor 100 may provide search results for the at least one second term. For example, in a manner analogous to step S50 as stated above, the processor 100 may send the search results to the client device 50 and the client device 50 may display the search results on the display device of the client device 50. The process shown in FIG. 6 may end after step S80.

When providing the search results at step S80 of FIG. 6, the search results may be sorted according to the ranking scores determined for the search results by the search software. In case more than one second terms have been selected in step S60, the search at step S70 may be performed for each of the second terms and a set of search results may be obtained for each of the second terms. Thus, the ranking score of each search result in the set of search results may indicate relevance to the corresponding second term. In such case that more than one second terms have been selected in step S60, the processor 100 of the enhanced search system 10 may sort the search results taking not only the ranking scores determined by the search software into consideration but also the similarities between the word vector representing the first term and the word vectors representing the second terms.

Figure 8:
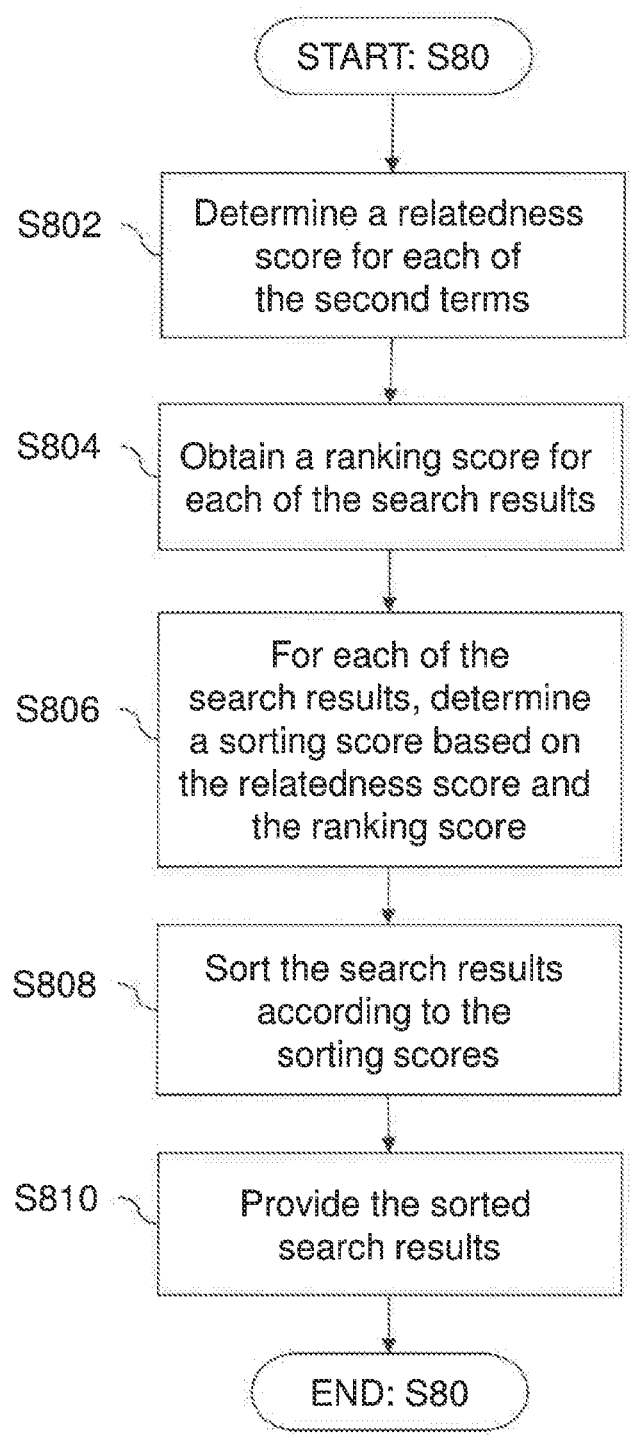
FIG. 8 shows a flowchart of an exemplary process performed in step S80 of FIG. 6.

FIG. 8 shows a flowchart of an exemplary process performed in step S80 of FIG. 6 in case more than one second terms have been selected.

At step S802 of FIG. 8, the processor 100 may determine a relatedness score for each of the second terms. For example, the relatedness score may be determined, for each second term, based on the similarity between the word vector representing the first term and the word vector representing that second term. In some examples, the processor 100 may simply consider the value of the similarity as the relatedness score. For a specific example, in case the similarity has a value between −1 and 1, with a value closer to 1 being considered more similar (e.g. the cosine similarity as mentioned above), the processor 100 may consider the value of the similarity as the relatedness score. In other examples, the processor 100 may calculate a normalized value using the value of the similarity and consider the calculated normalized value as the relatedness score. In any case, the relatedness score may be determined such that a larger value of the relatedness score indicates the corresponding second term being more relevant to the first term. The process may proceed to step S804 after step S802.

At step S804, the processor 100 may obtain a ranking score for each of the search results. The ranking score may have been determined by the search software as stated above with reference to step S70 of FIG. 6. The process may proceed to step S806 after step S804.

At step S806, the processor 100 may determine, for each of the search results, a sorting score based on the relatedness score of the second term for which the search result is obtained and the ranking score of the search result. For example, the processor 100 may calculate a product of the relatedness score and the ranking score and the product may be considered as the sorting score. In other words, the sorting score r' may be obtained by multiplying the relatedness score r by the ranking score q for the search result (e.g., r'=r×q). The sorting score may also be understood as a new ranking score taking the relatedness score into consideration. The process may proceed to step S808 after step S806.

At step S808, the processor 100 may sort the search results according to the sorting scores. For example, the search results may be sorted such that the search results with higher sorting scores are shown first. The process may proceed to step S810 after step S808.

At step S810, the processor 100 may provide the sorted search results. For example, the processor 100 may send the sorted search results to the client device 50 via the network 60 and the client device 50 may display the sorted search results on the display device of the client device 50.

After step S810, step S80 of FIG. 6 may end and the exemplary process of FIG. 6 may also end.

According to the exemplary process described above with reference to FIGS. 6 to 8, even in case no search result is found for the term included in the user input (e.g. the first term), the enhanced search system 10 can provide search results for one or more (second) terms that are related to the term included in the user input.

Although the enhanced search system 10 as described above receives a user input including a single first term, in some other examples, the enhanced search system 10 may receive a user input including more than one first terms. In such examples, the enhanced search system 10 may perform the process shown in FIGS. 6 to 8 for each of the first terms.

Exemplary Use Case

The enhanced search system 10 as described above may be used by or incorporated into an e-commerce application.

E-commerce applications may offer capability to search for products and/or services submitting particular keywords or search terms that could indicate one or more products and/or services present in a catalog. For example, when users search for specific products that are not in the catalog, users might not receive any search result, even though they might accept products with similar characteristics. In such circumstances, the enhanced search system 10 as described above can present items that are somehow related to what the user is looking for, which can reduce user's frustration. Users may be provided with the option to select similar products, and finalize the purchase, rather than not having this option at all.

If a customer searches for the term "Chardonnay" (which may be considered as an example of the first term), it is likely that he/she intends to get some results related to a type of wine. With the enhanced search system 10 as described above, when that product is out of stock, the enhanced search system 10 can automatically suggest the customer that 'Sauvignon' or 'Pinot' (which may be considered as examples of the second terms) can be a suitable alternative (see e.g., the processing after No in step S40 in FIG. 6), for example, like a clerk in a supermarket can suggest alternative items whenever the specific requested by the customer is missing from the shelves.

Obtaining word vectors to be stored in the word vector DB 30 by the word embedding system 40 as described above (see e.g., FIG. 5) may provide the possibility to create search terms (e.g., the second terms) that present an acceptable grade of relatedness to a given term (e.g., the first term). For example, preparing a corpus to be used for obtaining the word vectors (see e.g., step S10 of FIG. 5) may be considered as acquiring a source of knowledge which may enable construction of relations between terms. Further, for example, processing the corpus according to a word embedding algorithm (see e.g., step S12 of FIG. 5) may elaborate the source of knowledge and provide a computable function for determining the relatedness score between words. Since the characteristics of the corpus may affect the characteristics of the obtained word vectors, it may be preferable to construct topic-specific corpuses, particularly in the use case of an e-commerce application. For instance, in the wine example above, obtaining the word vectors from a corpus related to food may provide much more information regarding relatedness between words, than using a generic corpus for obtaining the word vectors. Depending on the products and/or services dealt with by the e-commerce application, texts regarding specific market segments such as food, cars, hotels, travels etc. may be collected for preparing the corpus. Thus, it may be possible to cover a wide range of merchants with a limited number of collected corpuses.

The word vectors elaborated out of a food corpus, can provide, for the term "Chardonnay", the following related terms with the following similarity values, for example:

Chardonnay→Prosecco [0.89], Sauvignon [0.76], Pinot [0.74]. . . .

In this example, the term "Prosecco" has a similarity value of 0.89, the term "Sauvignon" has a similarity value of 0.76 and the term "Pinot" has a similarity value of 0.74, with respect to the term "Chardonnay". The related terms, "Prosecco", "Sauvignon" and "Pinot" may be used as query for the search (see e.g., search for the second terms at step S70 of FIG. 6).

As stated above with regards to the search at steps S30 and S70 of FIG. 6, in information retrieval, ranking scores of the search results may be determined, which indicate the relevance of the search results and which may be used for sorting the search results.

As described above with respect to the exemplary process shown in FIG. 8, the sorting of the search results may consider not only the ranking scores determined by the search software but also the similarities based on the word vectors (e.g., in the form of relatedness scores). For instance, a sorting score r' (e.g. a new ranking score) of a search result may be obtained by multiplying the relatedness score r of the second term for which the search result is obtained by the ranking score q of the search result: r'=r×q (see also, e.g., step S806 of FIG. 8).

In the specific example of the term "Chardonnay" as the first term as stated above, if a search result of one of the second terms, "Prosecco" with the relatedness score of 0.89, has a ranking score of 0.9, the new ranking score, e.g. the sorting score r', may be: r'=0.9×0.89=0.801.

Using pseudo code, the algorithm for providing search results for alternative terms (second terms) in case no search result for the first term in the user input is found may be declared, for example, as follows:

```
Algorithm retrieve_alternatives is
Input: unrecognized term query, word vectors word2vec
Output: list of products and ranking
Query_embeddings ← get similarities of query from word2vec
Results ← empty
For each w in query_embeddings:
result ← search by w
Result .ranking ← result.ranking * w.score
append result to results
Return results sort by ranking
```

In the exemplary algorithm as shown above, word2vec is used as the word embedding algorithm for obtaining the word vectors.

The exemplary algorithm as shown above may correspond to steps S60, S70 and S80 of FIG. 6 as well as steps S602 to S608 of FIG. 7 and steps S802 to S810 of FIG. 8.

Accordingly, the enhanced search system 10 and the word embedding system 40 as described above may help e-commerce solutions by providing alternative search results that are related to the items the user is looking for. Further, the enhanced search system 10 as described above can provide a neutral recommending engine. Unlike other recommenders, the enhanced search system 10 as described above does not need previously collected customer behaviors. Thus, the enhanced search system 10 as described above can operate immediately on brand-new e-commerce shops, before information on customer behaviors is collected. By the enhanced search system 10 and the word embedding system 40 as described above, market-specific knowledge (e.g. text corpus) may be combined, by means of a word embedding algorithm, with traditional information retrieval for product search.

Hardware Configuration

Figure 9:
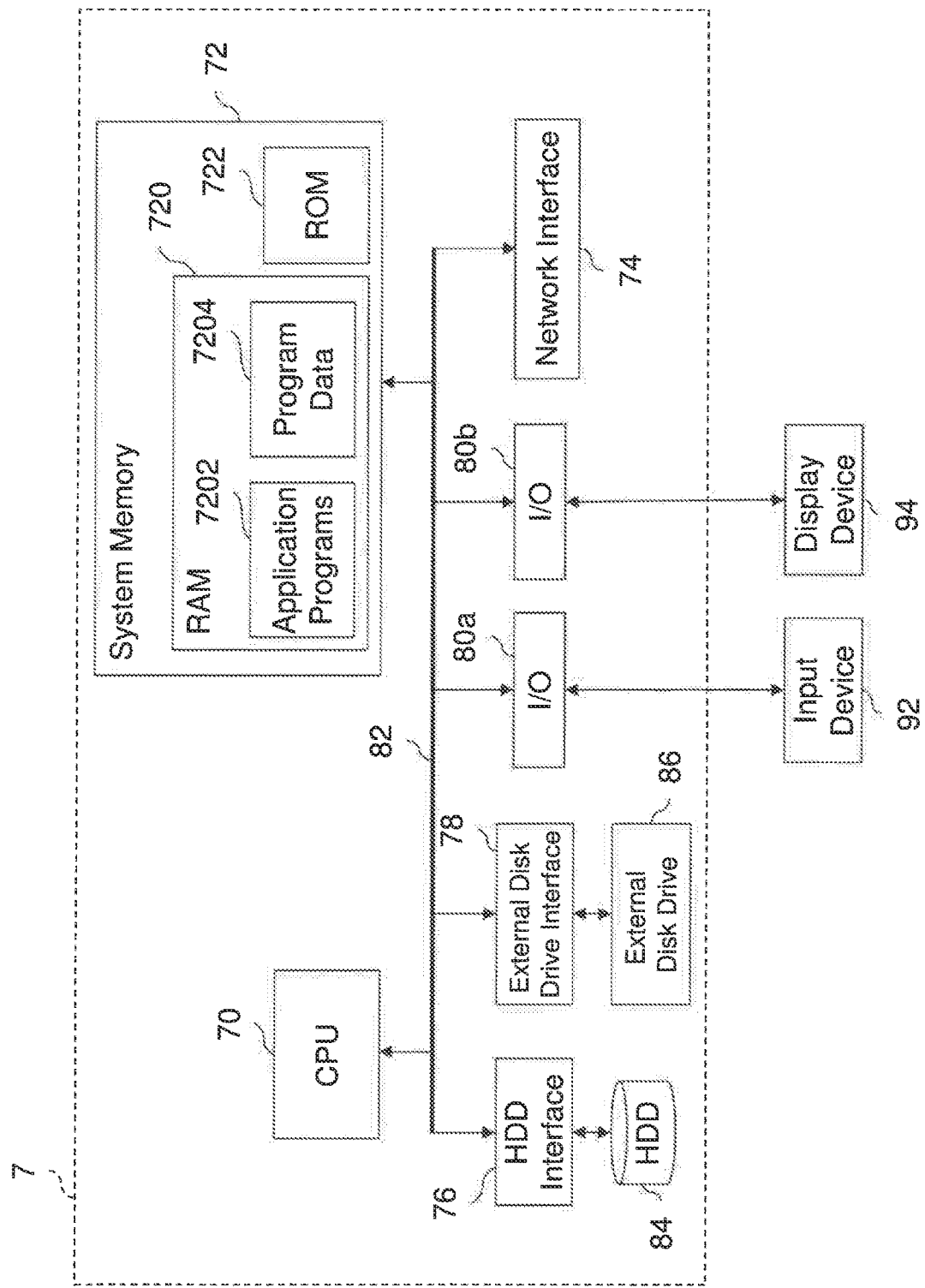
FIG. 9 shows an exemplary hardware configuration of a computer that may be used to implement at least a part of the system described herein.

FIG. 9 shows an exemplary hardware configuration of a computer that may be used to implement the enhanced search system 10, the word embedding system 40 and/or the client device 50. The computer 7 shown in FIG. 9 includes a CPU 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The CPU 70 may implement the processors of the exemplary devices and/or system described above. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the method for collecting and/or retrieving information relating to objects, as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 9, the computer 7 may further be connected to a printer and/or an imaging device such as a camera, via corresponding I/O interfaces and the system bus 82.

In addition or as an alternative to an implementation using a computer 7 as shown in FIG. 9, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A system comprising:
    a word vector database configured to store word vectors, each of the word vectors representing a word or a phrase;
    a text database configured to store text data; and
    a processor configured to:
        receive a user input including a first term;
        obtain from the word vector, for each word vector that is stored in the word vector database and that represents a word or a phrase other than the first term, a similarity between that respective word vector and a word vector representing the first term;
        based on a determination that the first term is not an out-of-vocabulary word, select at least one second term based on the obtained similarity;
        based on a determination that the first term is an out-of-vocabulary word:
            determine a word vector representative of the first term by summing one or more vectors representing character n-grams in the first term, where the first term is represented as a set of character n-grams;
            obtain, for each word vector stored in the word vector database and that represents a word or a phrase other than the first term, a similarity between that respective word vector and the determined word vector representative of the first term;
            identify one or more word vectors in the word vector database closest to the determined word vector representative of the first term;
            select at least one second term from words represented by the identified one or more word vectors;
        determine, in an instance a plurality of the second terms are selected, a relatedness score for each of the selected second terms based on a similarity between the word vector representing each of the plurality of the second terms and the word vector representing the first term for the first term that is not an out-of-vocabulary word, or based on the similarity between the word vector representing each of the plurality of the second terms and the determined word vector representative of the first term for the first term that is an out-of-vocabulary word;
        perform a search in the text database using the selected at least one second term as a query for the search;
        obtain a ranking score for each of a one or more results of the search;
        determine, for each of the one or more of the results of the search, a sorting score based on the ranking score obtained for each of the one or more results of the search and the relatedness score for the respective one of the selected plurality of the second terms that has been used for obtaining the one of the results of the search; and
        provide results of the search.

2. The system according to claim 1, wherein the processor is further configured to:
    sort the results of the search according to the sorting scores.

3. The system according to claim 1, wherein the obtained similarity is a cosine similarity between the word vector representing the word or the phrase other than the first term and the word vector representing the first term; and
    wherein the relatedness score for each one of the plurality of the second terms includes a value of the cosine similarity between the word vector representing the first term and the word vector representing said one of the plurality of the second terms.

4. The system according to claim 1, wherein the text data stored in the text database is directed to a specific topic; and
    wherein the word vectors stored in the word vector database are obtained by processing, according to a word embedding algorithm, a corpus including texts directed to the specific topic.

5. The system according to claim 4, further comprising a word embedding system configured to:
    obtain the word vectors by processing, according to the word embedding algorithm, the corpus including texts directed to the specific topic.

6. The system according to claim 5, wherein the word embedding algorithm uses character n-grams of words in the corpus for obtaining the word vectors.

7. A computer-implemented method comprising:
    receiving a user input including a first term;
    obtaining, for each word vector that is stored in a word vector database and that represents a word or a phrase other than the first term, a similarity between that respective word vector and a word vector representing the first term;
    based on a determination that the first term is not an out-of-vocabulary word, selecting at least one second term based on the obtained similarity;
    based on a determination that the first term is an out-of-vocabulary word:
        determining a word vector representative of the first term by summing one or more vectors representing character n-grams in the first term, where the first term is represented as a set of character n-grams;
        obtaining, for each word vector stored in the word vector database and that represents a word or a phrase other than the first term, a similarity between that respective word vector and the determined word vector representative of the first term;
        identifying one or more word vectors in the word vector database closest to the determined word vector representative of the first term; and
        select at least one second term from words represented by the identified one or more word vectors;
    determining, in an instance a plurality of the second terms are selected, a relatedness score for each of the selected second terms based on a similarity between the word vector representing each of the plurality of the second terms and the word vector representing the first term for the first term that is not an out-of-vocabulary word, and based on the similarity between the word vector representing each of the plurality of the second terms and the determined word vector representative of the first term for the first term that is an out-of-vocabulary word;

performing a search in a text database configured to store text data using the selected at least one second term as a query for the search;

obtaining a ranking score for each of a one or more results of the search;

determining, for each of the one or more results of the search, a sorting score based on the ranking score obtained for each of the one or more results of the search and the relatedness score for the respective one of the selected plurality of the second terms that has been used for obtaining the one of the results of the search; and providing results of the search.

8. The method according to claim 7, further comprising:
sorting the results of the search according to the sorting scores.

9. The method according to claim 7, wherein the obtained similarity is a cosine similarity between the word vector representing the word or the phrase other than the first term and the word vector representing the first term; and
wherein the relatedness score for each one of the plurality of the second terms includes a value of the cosine similarity between the word vector representing the first term and the word vector representing said one of the plurality of the second terms.

10. The method according to claim 8, wherein the text data stored in the text database is directed to a specific topic; and
wherein the word vectors stored in the word vector database are obtained by processing, according to a word embedding algorithm, a corpus including texts directed to the specific topic.

11. The method according to claim 10, further comprising:
obtaining the word vectors by processing, according to the word embedding algorithm, the corpus including texts directed to the specific topic.

12. The method according to claim 11, wherein the word embedding algorithm uses character n-grams of words in the corpus for obtaining the word vectors.

13. A computer program product comprising computer-readable instructions that, when loaded and run on a computer, cause the computer to:
receive a user input including a first term;
obtain, for each word vector that is stored in a word vector database and that represents a word or a phrase other than the first term, a similarity between that respective word vector and a word vector representing the first term;
based on a determination that the first term is not an out-of-vocabulary word, select at least one second term based on the obtained similarity;
based on a determination that the first term is an out-of-vocabulary word:
determine a word vector representative of the first term by summing one or more vectors representing character n-grams in the first term, where the first term is represented as a set of character n-grams;
obtain, for each word vector stored in the word vector database and that represents a word or a phrase other than the first term, a similarity between that respective word vector and the determined word vector representative of the first term;
identify one or more word vectors in the word vector database closest to the determined word vector representative of the first term; and
select at least one second term from words represented by the identified one or more word vectors;
determine, in an instance a plurality of the second terms are selected, a relatedness score for each of the selected second terms based on a similarity between the word vector representing each of the plurality of the second terms and the word vector representing the first term for the first term that is not an out-of-vocabulary word, and based on the similarity between the word vector representing each of the plurality of the second terms and the determined word vector representative of the first term for the first term that is an out-of-vocabulary word;
perform a search in a text database configured to store text data using the selected at least one second term as a query for the search;
obtain a ranking score for each one of a one or more results of the search;
determine, for each of the one or more results of the search, a sorting score based on the ranking score obtained for each of the one or more results of the search and the relatedness score for the respective one of the selected plurality of the second terms that has been used for obtaining the one of the results of the search; and
provide results of the search.

14. The computer program product according to claim 13, comprising computer-readable instructions that, when loaded and run on a computer, further cause the computer to:
sort the results of the search according to the sorting scores.

15. The computer program product according to claim 13, wherein the obtained similarity is a cosine similarity between the word vector representing the word or the phrase other than the first term and the word vector representing the first term; and
wherein the relatedness score for each one of the plurality of the second terms includes a value of the cosine similarity between the word vector representing the first term and the word vector representing said one of the plurality of the second terms.

16. The computer program product according to claim 14, wherein the text data stored in the text database is directed to a specific topic; and
wherein the word vectors stored in the word vector database are obtained by processing, according to a word embedding algorithm, a corpus including texts directed to the specific topic.

17. The computer program product according to claim 16, comprising computer-readable instructions that, when loaded and run on a computer, further cause the computer to:
obtain the word vectors by processing, according to the word embedding algorithm, the corpus including texts directed to the specific topic.

* * * * *